(No Model.)

D. E. MENTZEL.
BRAKE ATTACHMENT FOR THE STEER WHEELS OF HEADERS.

No. 477,136. Patented June 14, 1892.

WITNESSES:
F. McArdle.
C. Sedgwick.

INVENTOR:
D. E. Mentzel
BY Munn & Co.
ATTORNEYS.

United States Patent Office.

DANIEL ERNEST MENTZEL, OF SPANGLE, WASHINGTON.

BRAKE ATTACHMENT FOR THE STEER-WHEELS OF HEADERS.

SPECIFICATION forming part of Letters Patent No. 477,136, dated June 14, 1892.

Application filed January 29, 1892. Serial No. 419,690. (No model.)

*To all whom it may concern:*

Be it known that I, DANIEL ERNEST MENTZEL, of Spangle, in the county of Spokane and State of Washington, have invented a new and Improved Brake Attachment for the Steer-Wheels of Headers, of which the following is a full, clear, and exact description.

My invention relates to a brake adapted to be applied to what are known as the "steer-wheels" of headers or harvesters; and the object of the invention is to provide a device by the means of which an operator upon a harvester or header manipulating the steer-wheel may expeditiously and conveniently apply the brake to the wheel in such a manner as to retard the speed of the implement or fully stop the same, and also to provide a means whereby the brake may be held without the aid of the operator in more or less close engagement with the wheel.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
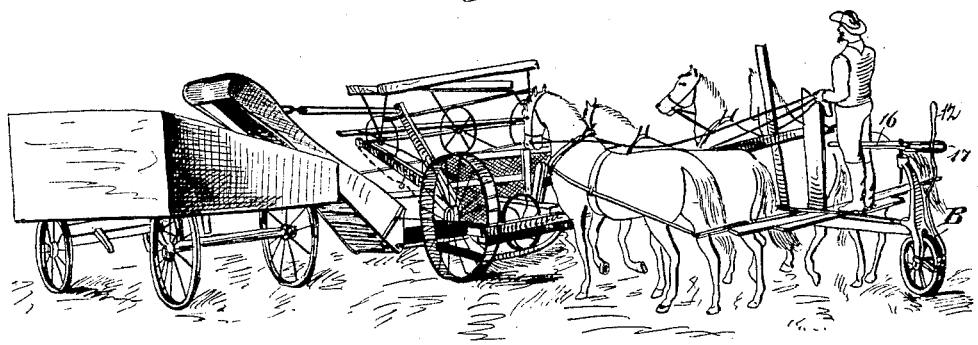
Figures 2, 3, 4:
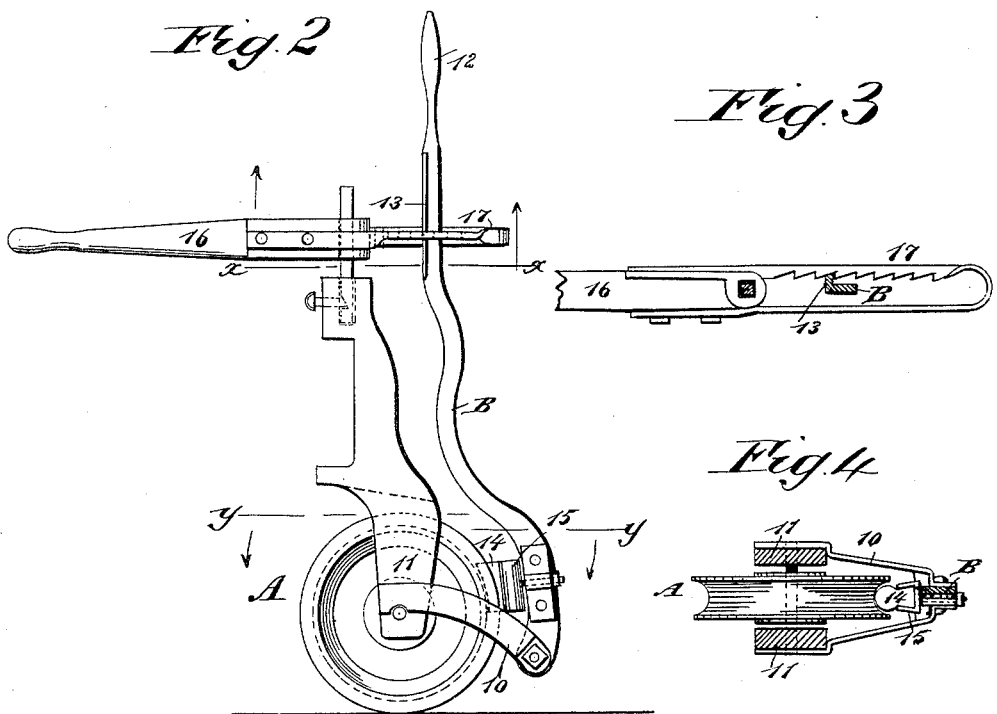

Figure 1 is a perspective view of the steer-wheel and brake, illustrating the application of the latter to the former and the position that the former sustains with relation to the header. Fig. 2 is a side elevation of the brake and the steer-wheel. Fig. 3 is a transverse section on the line $x\,x$ of Fig. 2, and Fig. 4 is a similar section taken on the line $y\,y$ of Fig. 2.

The steer-wheel A may be of any suitable or approved construction and is attached to the push-tongue of a header or harvester in the usual manner. A yoke 10 is secured at the inner extremities of its members to the outer faces of the straddle-iron 11 of the steer-wheel, and the said yoke is ordinarily slightly curved downward and extends some distance back of the steer-wheel, or a sufficient distance to clear the wheel. At the rear or bow portion of the yoke 10 the lower end of a lever B is fulcrumed. This lever extends upward in a vertical direction some distance above the top of the steer-wheel and terminates in a handle 12, the said lever being usually provided with a feather 13 at one edge.

Near the pivotal connection of the lever B with the yoke 10 a brake-shoe 14 is located, the said brake-shoe being preferably made of wood, and the shoe is fitted in a socket 15, of any suitable or approved construction, securely attached to the forward face of the lever. The brake-shoe may be of any approved shape in cross-section; but as the steer-wheel is usually peripherally grooved, as shown in Fig. 4, that portion of the shoe adapted to engage with the periphery of the wheel is made cylindrical.

From the rear end of the steering-arm 16 of the steer-wheel a horizontal rack 17 is projected, through which rack the upper end of the lever B extends, and the teeth of the rack are adapted to be engaged by the feather 13 of the lever when the lever is to be held in a braking or in a partially-braking position.

I desire it to be distinctly understood that any approved form of rack may be employed and that the connection between the rack and the lever may be effected in any well-known manner. The brake may be readily applied to the steer-wheel or removed therefrom by the operator, as the handle of the brake-lever is immediately back of him, as shown in Fig. 1, and by engaging the upper end of the brake-lever with the teeth of the rack 17 the lever may be held in the position in which it is desired that it should be maintained. In applying the brake the lever is drawn toward the operator and in removing the brake the lever is carried rearward.

Having thus described my invention, I claim as new and desire to secure by Letters Patent—

1. The combination, with the steering-wheel of a harvester, header, or like apparatus, provided with a forwardly-projecting guide-arm having a rearward-projecting open guide or yoke, of a brake to engage the wheel and provided with an operating-lever extending upward through guide or yoke for operation by the driver, and a locking device for locking the lever to the said guide or yoke, substantially as set forth.

2. The combination, with the steer-wheel of a harvester, header, or like agricultural implement and its straddle-iron and guide-arm, of a yoke projected rearward from the straddle-iron, a lever fulcrumed upon the yoke, a brake-shoe carried by the lever and adapted for engagement with the wheel, and a rack projected from the guide-arm of the wheel and adapted to be engaged by the lever, as and for the purpose specified.

DANIEL ERNEST MENTZEL.

Witnesses:
AUGUST SICKAU,
RODMAN DRAKE.